US012581539B2

(12) United States Patent
Jiang et al.

(10) Patent No.: US 12,581,539 B2
(45) Date of Patent: Mar. 17, 2026

(54) METHOD AND DEVICE IN NODES USED FOR WIRELESS COMMUNICATION

(71) Applicant: APOGEE NETWORKS, LLC, Dallas, TX (US)

(72) Inventors: Qi Jiang, Shanghai (CN); Xiaobo Zhang, Shanghai (CN)

(73) Assignee: APOGEE NETWORKS, LLC, Dallas, TX (US)

( * ) Notice: Subject to any disclaimer, the term of this patent is extended or adjusted under 35 U.S.C. 154(b) by 399 days.

(21) Appl. No.: 17/994,015

(22) Filed: Nov. 25, 2022

(65) Prior Publication Data

US 2023/0171812 A1 Jun. 1, 2023

(30) Foreign Application Priority Data

Dec. 1, 2021 (CN) .......................... 202111450827.9

(51) Int. Cl.
*H04W 74/08* (2024.01)
*H04L 1/00* (2006.01)
(Continued)

(52) U.S. Cl.
CPC ....... *H04W 74/0833* (2013.01); *H04L 1/0061* (2013.01); *H04L 5/0092* (2013.01); *H04W 74/0836* (2024.01); *H04W 74/0838* (2024.01)

(58) Field of Classification Search
CPC ......... H04W 74/0833; H04W 74/0836; H04W 74/0838; H04W 74/006; H04L 5/0092;
(Continued)

(56) References Cited

U.S. PATENT DOCUMENTS 12,213,178 B2 1/2025 Akkarakaran et al.
12,382,510 B2 8/2025 Wu
(Continued)

FOREIGN PATENT DOCUMENTS

WO 2021136155 A1 7/2021
WO WO-2022133009 A2 * 6/2022 ........... H04L 5/0048

OTHER PUBLICATIONS

Nokia et al., "RACH Report logging of 2-step and 4-step RACH Information," 3GPP TSG-RAN WG2 Meeting #113 Electronic, R2-2100601 (Jan. 25-Feb. 5, 2021).
(Continued)

*Primary Examiner* — Phong La
(74) *Attorney, Agent, or Firm* — Volpe Koenig

(57) ABSTRACT

The present application provides a method and a device in a node for wireless communications. A node firstly receives a target information block, the target information block being generated in a protocol layer below an RRC layer, the target information block being used to determine a first time-frequency resource; and then performs a first random access procedure, the action of performing the first random access procedure comprising transmitting a first message; the first time-frequency resource is associated with one of a first identity and a second identity; the first message is used for random access; whether the first time-frequency resource is associated with the first identity is used to determine whether the first message is an MsgA or an Msg1. This application improves the criterion for determining 2-step random access in the case of Multi-TRP, thereby enhancing the efficiency of random access and optimizing the system performance.

18 Claims, 5 Drawing Sheets

(51) Int. Cl.
| | |
|---|---|
| H04L 5/00 | (2006.01) |
| H04W 74/0833 | (2024.01) |
| *H04W 74/0836* | (2024.01) |
| *H04W 74/0838* | (2024.01) |

(58) Field of Classification Search
CPC ... H04L 5/0053; H04L 5/0091; H04L 5/0094;
H04L 5/0096
See application file for complete search history.

(56) References Cited

U.S. PATENT DOCUMENTS

| | | | | |
|---|---|---|---|---|
| 2019/0200396 | A1* | 6/2019 | Agiwal | H04L 5/0098 |
| 2020/0100297 | A1 | 3/2020 | Agiwal et al. | |
| 2021/0105813 | A1* | 4/2021 | Lee | H04W 74/0833 |
| 2021/0227533 | A1 | 7/2021 | Zhang et al. | |
| 2021/0243812 | A1 | 8/2021 | Agiwal et al. | |
| 2022/0039175 | A1* | 2/2022 | Zhou | H04W 24/08 |
| 2022/0053558 | A1* | 2/2022 | Zhao | H04W 24/08 |
| 2022/0132587 | A1* | 4/2022 | Agiwal | H04L 1/1887 |
| 2022/0369139 | A1* | 11/2022 | Wang | H04W 36/305 |
| 2023/0132942 | A1* | 5/2023 | Xiong | H04W 74/0836 370/329 |
| 2023/0156819 | A1* | 5/2023 | Agiwal | H04W 74/0841 370/329 |
| 2024/0032146 | A1* | 1/2024 | Park | H04W 76/38 |
| 2024/0324020 | A1* | 9/2024 | Zheng | H04W 72/1268 |
| 2024/0365316 | A1* | 10/2024 | Alfarhan | H04W 72/52 |

OTHER PUBLICATIONS

Third Generation Partnership Project, "Technical Specification Group Radio Access Network; NR; Physical layer procedures for control (Release 16)," 3GPP TS 38.213 V16.7.0 (Sep. 2021).

Third Generation Partnership Project, "Technical Specification Group Radio Access Network; NR; Physical layer procedures for data (Release 16)," 3GPP TS 38.214 V16.7.0 (Sep. 2021).

Third Generation Partnership Project, "Technical Specification Group Radio Access Network; NR; Medium Access Control (MAC) protocol specification (Release 16)," 3GPP TS 38.321 V16.6.0 (Sep. 2021).

Third Generation Partnership Project, "Technical Specification Group Radio Access Network; NR; Physical channels and modulation (Release 16)," 3GPP TS 38.211 V16.7.0 (Sep. 2021).

Third Generation Partnership Project, "Technical Specification Group Radio Access Network; NR; Multiplexing and channel coding (Release 16)," 3GPP TS 38.212 V16.7.0 (Sep. 2021).

Third Generation Partnership Project, "Technical Specification Group Radio Access Network; NR; Radio Resource Control (RRC) protocol specification (Release 16)," 3GPP TS 38.331 V16.6.0 (Sep. 2021).

* cited by examiner

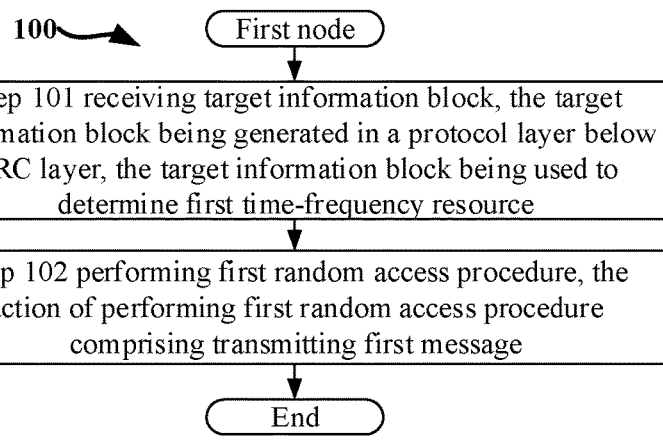

100 ⟶  ( First node )

Step 101 receiving target information block, the target information block being generated in a protocol layer below RRC layer, the target information block being used to determine first time-frequency resource Step 102 performing first random access procedure, the action of performing first random access procedure comprising transmitting first message ( End )

FIG. 1

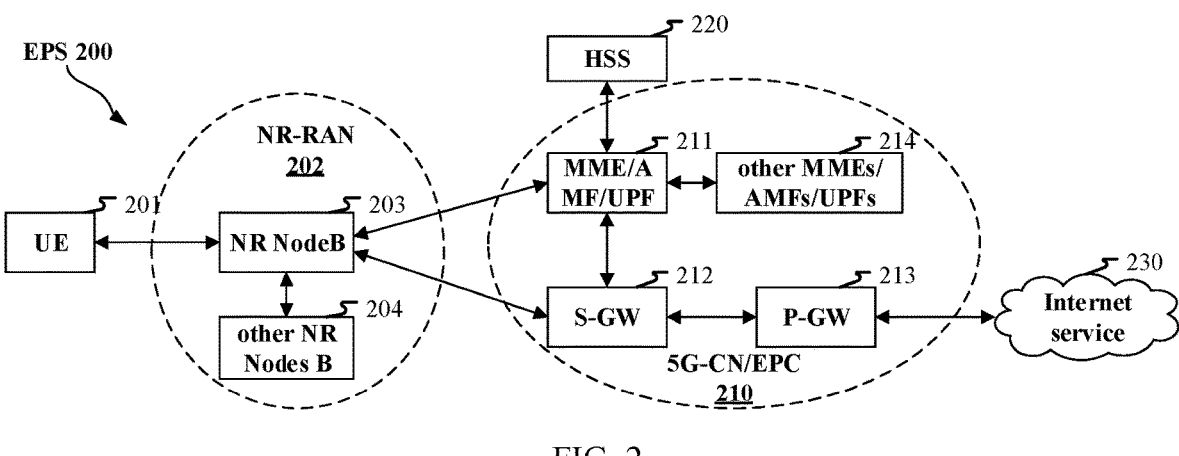

METHOD AND DEVICE IN NODES USED FOR WIRELESS COMMUNICATION

CROSS REFERENCE TO RELATED APPLICATIONS

This application claims the priority benefit of Chinese Patent Application No. 202111450827.9, filed on Dec. 1, 2021, the full disclosure of which is incorporated herein by reference.

BACKGROUND

Technical Field

The present application relates to transmission methods and devices in wireless communication systems, and in particular to a transmission scheme and device for random access procedure in wireless communications.

Related Art

In 5G New Radio (NR), Massive Multi-Input Multi-Output (MIMO) is a key technology. In Massive MIMO, multiple antennas form through Beamforming a narrow beam pointing in a specific direction to enhance communication quality. In 5G NR, a base station can update a Transmission Configuration Indication (TCI) used by a terminal for receiving a Physical Downlink Control Channel (PDCCH), as well as a TCI used for receiving a Physical Downlink Shared Channel (PDSCH) through one or more Medium Access Control (MAC) Control Elements (CE), thus ensuring the performance gains brought about by beamforming. Similarly, the base station can update via a piece of Downlink Control Information (DCI) the Quasi Co-located (QCL) parameters used by multiple different channel types and QCL parameters on multiple carriers to reduce signaling overhead.

As discussed in NR R17, the subject of Inter-cell Operation targeting the Multi-TRP scenario is on hot debate, where at the RAN1 #104b-e conference, an extra Physical Cell Identity (PCI) different from a PCI of a serving cell is being introduced.

SUMMARY

In the existing NR system, with a view to improving the rate of random access, the UE can choose the type of random access as 2-step random access (RA) based on its own condition when simultaneously configured with time-frequency resources for 2-step RA type and time-frequency resources for 4-step RA type, hence an increase in the access rate. However, at the RAN1 #107th conference, an agreement on the M-TRP scenario was made that the UE is not required to monitor a Common Search Space (CSS) of type 0/0A/1 in a Control Resource Set (CORESET) by which an active TCI state used is a PCI other than a PCT associated with a serving cell. Due to the above protocols, the application of 2-step random access will be restricted to some extent under the M-TRP scenario.

To address the issue of random access in the aforementioned M-TRP scenario, the present application provides a solution. It should be noted that the statement in the present application only takes M-TRP as a typical application scenario or example; this application is also applicable to other scenarios confronting similar problems, like single-TRP scenario, or a scenario of collaboration between multiple base stations, or a base station or User Equipment (UE) with stronger capability, or scenarios targeting different technical fields, and apart from random access, it can also apply to channel estimation, measurement, demodulation and so on, where similar technical effects can be achieved. Additionally, the adoption of a unified solution for various scenarios, including but not limited to M-TRP scenario, contributes to the reduction of hardcore complexity and costs. In the case of no conflict, the embodiments of a first node and the characteristics in the embodiments may be applied to a second node, and vice versa. Particularly, for interpretations of the terminology, nouns, functions and variants (unless otherwise specified) in the present application, refer to definitions given in TS36 series, TS38 series and TS37 series of 3GPP specifications.

The present application provides a method in a first node for wireless communications, comprising:

receiving a target information block, the target information block being generated in a protocol layer below a Radio Resource Control (RRC) layer, the target information block being used to determine a first time-frequency resource; and performing a first random access procedure, the action of performing the first random access procedure comprising transmitting a first message;

herein, the first time-frequency resource is associated with one of a first identity and a second identity;

the first message is used for random access; whether the first time-frequency resource is associated with the first identity is used to determine whether the first message is a Message A (MsgA) or a Message 1 (Msg1); the first identity and the second identity are both non-negative integers; at least one of the first identity or the second identity is a physical cell identifier (PCI).

In one embodiment, the above method is characterized in that: when the QCL relation of a terminal is updated by a unified TCI, and the QCL relation after change is associated with a Physical Cell Identity (PCI) other than a PCI of the serving cell, then the updated QCL relation cannot be used for 2-step random access.

In one embodiment, the above method is characterized also in that: a beamforming vector maintained by a cell other than the serving cell cannot be used for 2-step random access, which further ensures the stability of random access.

According to one aspect of the present application, comprising:

receiving a first signaling;

herein, the first signaling is used to indicate a second time-frequency resource, the second time-frequency resource being associated with the second identity; and as a response to receiving the first signaling, stopping the first random access procedure; the first time-frequency resource is associated with the first identity, the first message being an MsgA; the action of performing the first random access procedure comprises monitoring a second signaling in a first search space; the second signaling is used for scheduling a response to the first message; the action of stopping the first random access procedure comprises stopping monitoring the second signaling.

In one embodiment, the above method is characterized in that: when a unified TCI appears during the 2-step RA procedure to indicate a change to a QCL relation, and the changed QCL relation is associated with a PCI other than a PCI of a serving cell, the RA procedure is terminated to avoid resource waste.

According to one aspect of the present application, the first random access procedure is used for a Scheduling Request (SR), and the action of stopping the first random access procedure does not comprise canceling an SR used for triggering the first random access procedure.

In one embodiment, the above method is characterized in that maintaining operations targeting the SR even after stopping a random access procedure, thus ensuring the performance of the SR.

According to one aspect of the present application, comprising:

performing a channel measurement on a first signal to determine a first measurement value;

herein, the first time-frequency resource is associated with the first signal, and whether the first measurement value is above a first threshold is used to determine whether the first message is an MsgA or an Msg1.

According to one aspect of the present application, the first random access procedure is performed on a first Bandwidth Part (BWP), a mch-ConfigDedicated used for configuring the first BWP provides contention-free 2-step random access type (2-step RA type) random access resources but does not provide contention-free 4-step random access type (4-step RA type) random access resources.

According to one aspect of the present application, comprising:

receiving at least a former one of a first information block and a second information block;

herein, the first information block is used to determine a first candidate time-frequency resource set, while the second information block is used to determine a second candidate time-frequency resource set; when the first message is an MsgA, time-frequency resources occupied by the first message belong to the first candidate time-frequency resource set; when the first message is an Msg1, time-frequency resources occupied by the first message belong to the second candidate time-frequency resource set.

According to one aspect of the present application, comprising:

receiving a second signaling, the second signaling being used to schedule a response to the first message;

herein, a Cyclic Redundancy Check (CRC) comprised in the second signaling is scrambled by a first Radio Network Temporary Identifier (RNTI), the first RNTI being related to time-frequency resources occupied by the first message; whether a first integer is used to determine the first RNTI is related to whether the first message is an MsgA or an Msg1, the first integer being fixed or the first integer being configured via an RRC signaling.

The present application provides a method in a second node for wireless communications, comprising:

transmitting a target information block, the target information block being generated in a protocol layer below a Radio Resource Control (RRC) layer, the target information block being used to determine a first time-frequency resource; and performing a first random access procedure, the action of performing the first random access procedure comprising receiving a first message;

herein, the first time-frequency resource is associated with one of a first identity and a second identity;

the first message is used for random access; whether the first time-frequency resource is associated with the first identity is used to determine whether the first message is a Message A (MsgA) or a Message 1 (Msg1); the first identity and the second identity are both non-negative integers; at least one of the first identity or the second identity is a physical cell identifier (PCI).

According to one aspect of the present application, comprising:

transmitting a first signaling;

herein, the first signaling is used to indicate a second time-frequency resource, the second time-frequency resource being associated with the second identity; as a response to transmitting the first signaling, the second node stops the first random access procedure; the first time-frequency resource is associated with the first identity, the first message being an MsgA; the action of performing the first random access procedure comprises monitoring a second signaling in a first search space; the second signaling is used for scheduling a response to the first message; the action of stopping the first random access procedure comprises stopping monitoring the second signaling.

According to one aspect of the present application, the first random access procedure is used for a Scheduling Request (SR), and the action of stopping the first random access procedure does not comprise cancelling an SR used to trigger the first random access procedure.

According to one aspect of the present application, comprising:

transmitting a first signal;

herein, a channel measurement is performed on the first signal to determine a first measurement value;

the first time-frequency resource is associated with the first signal, and whether the first measurement value is above a first threshold is used to determine whether the first message is an MsgA or an Msg1.

According to one aspect of the present application, the first random access procedure is performed on a first BWP, a rach-ConfigDedicated used for configuring the first BWP provides contention-free 2-step RA type random access resources but does not provide contention-free 4-step RA type random access resources.

According to one aspect of the present application, comprising:

transmitting at least a former one of a first information block and a second information block;

herein, the first information block is used to determine a first candidate time-frequency resource set, while the second information block is used to determine a second candidate time-frequency resource set; when the first message is an MsgA, time-frequency resources occupied by the first message belong to the first candidate time-frequency resource set; when the first message is an Msg1, time-frequency resources occupied by the first message belong to the second candidate time-frequency resource set.

According to one aspect of the present application, comprising:

transmitting a second signaling, the second signaling being used to schedule a response to the first message;

herein, a Cyclic Redundancy Check (CRC) comprised in the second signaling is scrambled by a first Radio Network Temporary Identifier (RNTI), the first RNTI being related to time-frequency resources occupied by the first message; whether a first integer is used to determine the first RNTI is related to whether the first message is an MsgA or an Msg1, the first integer being fixed or the first integer being configured via an RRC signaling.

The present application provides a first node for wireless communications, comprising:

a first receiver, receiving a target information block, the target information block being generated in a protocol layer below a Radio Resource Control (RRC) layer, the target information block being used to determine a first time-frequency resource; and a first transceiver, performing a first random access procedure, the action of performing the first random access procedure comprising transmitting a first message;

herein, the first time-frequency resource is associated with one of a first identity and a second identity;

the first message is used for random access; whether the first time-frequency resource is associated with the first identity is used to determine whether the first message is a Message A (MsgA) or a Message 1 (Msg1); the first identity and the second identity are both non-negative integers; at least one of the first identity or the second identity is a physical cell identifier (PCI).

The present application provides a second node for wireless communications, comprising:

a first transmitter, transmitting a target information block, the target information block being generated in a protocol layer below an RRC layer, the target information block being used to determine a first time-frequency resource; and a second transceiver, performing a first random access procedure, the action of performing the first random access procedure comprising receiving a first message;

herein, the first time-frequency resource is associated with one of a first identity and a second identity;

the first message is used for random access; whether the first time-frequency resource is associated with the first identity is used to determine whether the first message is a Message A (MsgA) or a Message 1 (Msg1); the first identity and the second identity are both non-negative integers; at least one of the first identity or the second identity is a physical cell identifier (PCI).

BRIEF DESCRIPTION OF THE DRAWINGS

Other features, objects and advantages of the present application will become more apparent from the detailed description of non-restrictive embodiments taken in conjunction with the following drawings:

FIG. 1 illustrates a flowchart of processing of a first node according to one embodiment of the present application.

FIG. 2 illustrates a schematic diagram of a network architecture according to one embodiment of the present application.

DESCRIPTION OF THE EMBODIMENTS

Figure 3:
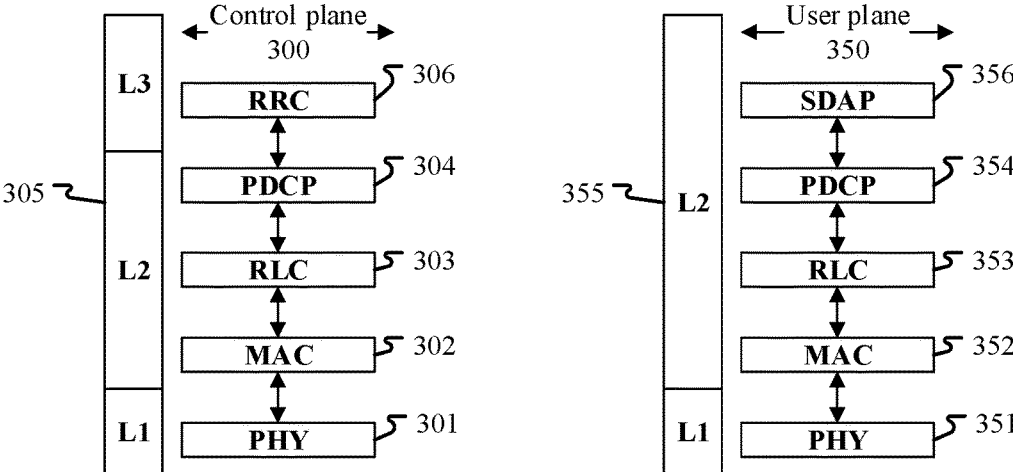
FIG. 3 illustrates a schematic diagram of a radio protocol architecture of a user plane and a control plane according to one embodiment of the present application.

The technical scheme of the present application is described below in further details in conjunction with the drawings. It should be noted that the embodiments of the present application and the characteristics of the embodiments may be arbitrarily combined if no conflict is caused.

Embodiment 1

Embodiment 1 illustrates a flowchart of processing of a first node, as shown in FIG. 1. In 100 illustrated by FIG. 1, each box represents a step. In Embodiment 1, the first node in the present application receives a target information block in step 101, the target information block being generated in a protocol layer below a Radio Resource Control (RRC) layer, the target information block being used to determine a first time-frequency resource; and performs a first random access procedure in step 102, the action of performing the first random access procedure comprising transmitting a first message.

In Embodiment 1, the first time-frequency resource is associated with one of a first identity and a second identity; the first message is used for random access; whether the first time-frequency resource is associated with the first identity is used to determine whether the first message is a Message A (MsgA) or a Message 1 (Msg1); the first identity and the second identity are both non-negative integers; at least one of the first identity or the second identity is a physical cell identifier (PCI).

In one embodiment, the target information block is transmitted via a physical layer signaling.

In one embodiment, the target information block is transmitted via a Media Access Control (MAC) Control Element (CE).

In one embodiment, the target information block is transmitted via a PDCCH.

In one embodiment, the target information block is transmitted via DCI.

In one embodiment, the target information block is used for indicating a TCI-StateId.

In one embodiment, the target information block is a TCI Field in DCI.

In one embodiment, the first time-frequency resource occupies more than one Resource Element (RE).

In one embodiment, the first time-frequency resource is used for transmitting Channel-State Information Reference Signals (CSI-RS).

In one embodiment, the first time-frequency resource is used for transmitting a reference signal.

In one embodiment, the first time-frequency resource is a CSI resource.

In one embodiment, the first time-frequency resource is a Non-Zero-Power (NZP) CSI-RS resource, or the first time-frequency resource is a Synchronization Signal/Physical Broadcast CHannel block (SSB) indicated by an ssb-Index.

In one embodiment, the target information block is used to indicate time-frequency resources occupied by the first time-frequency resource.

In one embodiment, the target information block is used to indicate a CSI-ResourceConfigId used by a reference signal transmitted in the first time-frequency resource.

In one embodiment, the target information block is used to indicate an identity used by a reference signal transmitted in the first time-frequency resource.

In one embodiment, the target information block is used to indicate an index used by a reference signal transmitted in the first time-frequency resource.

In one embodiment, the first time-frequency resource is associated with a TCI.

In one embodiment, the first time-frequency resource is associated with a TCI-State.

In one embodiment, the first time-frequency resource is associated with a TCI-StateId.

In one embodiment, the performing the first random access procedure includes receiving a Message B (MsgB).

In one embodiment, the performing the first random access procedure includes receiving an MsgB.

In one embodiment, the performing the first random access procedure includes receiving a Message 2 (Msg2).

In one embodiment, the performing the first random access procedure includes receiving a Random Access Response (RAR).

In one embodiment, the performing the first random access procedure includes transmitting a Message 3 (Msg3).

In one embodiment, the performing the first random access procedure includes receiving a Message 4 (Msg4).

In one embodiment, the performing the first random access procedure includes receiving a Contention Resolution.

In one embodiment, a physical layer channel occupied by the first message includes a Physical Random Access Channel (PRACH).

In one embodiment, a transmission channel occupied by the first message includes a Random Access Channel (RACH).

In one embodiment, the first time-frequency resource is associated with the first identity.

In one subembodiment, the meaning of the phrase that the first time-frequency resource is associated with the first identity comprises: an RRC signaling configuring the first time-frequency resource comprises the first identity.

In one subembodiment, the meaning of the phrase that the first time-frequency resource is associated with the first identity comprises: a reference signal (RS) in the first time-frequency resource is transmitted by a TRP corresponding to the first identity.

In one subembodiment, the meaning of the phrase that the first time-frequency resource is associated with the first identity comprises: the first time-frequency resource is maintained by a TRP corresponding to the first identity.

In one subembodiment, the meaning of the phrase that the first time-frequency resource is associated with the first identity comprises: a reference signal (RS) transmitted in the first time-frequency resource is scrambled by the first identity.

In one subembodiment, the meaning of the phrase that the first time-frequency resource is associated with the first identity comprises: the first identity is used for generating a reference signal (RS) transmitted in the first time-frequency resource.

In one subembodiment, the meaning of the phrase that the first time-frequency resource is associated with the first identity comprises: there is an explicit signaling indicating that the first time-frequency resource and the first identity are associated.

In one embodiment, the first time-frequency resource is associated with the second identity.

In one subembodiment, the meaning of the phrase that the first time-frequency resource is associated with the second identity comprises: a Radio Resource Control (RRC) signaling configuring the first time-frequency resource comprises the second identity.

In one subembodiment, the meaning of the phrase that the first time-frequency resource is associated with the second identity comprises: a reference signal (RS) in the first time-frequency resource is transmitted by a TRP corresponding to the second identity.

In one subembodiment, the meaning of the phrase that the first time-frequency resource is associated with the second identity comprises: the first time-frequency resource is maintained by a TRP corresponding to the second identity.

In one subembodiment, the meaning of the phrase that the first time-frequency resource is associated with the second identity comprises: a reference signal (RS) transmitted in the first time-frequency resource is scrambled by the second identity.

In one subembodiment, the meaning of the phrase that the first time-frequency resource is associated with the second identity comprises: the second identity is used for generating a reference signal (RS) transmitted in the first time-frequency resource.

In one subembodiment, the meaning of the phrase that the first time-frequency resource is associated with the second identity comprises: there is an explicit signaling indicating that the first time-frequency resource and the second identity are associated.

Typically, when the first time-frequency resource is associated with the first identity, the first message is an MsgA.

Typically, when the first time-frequency resource is associated with the second identity, the first message is an Msg1.

In one embodiment, when the first message is an MsgA, the first message comprises a PRACH Preamble and contents buffered in an MsgA in a Physical Uplink Shared Channel (PUSCH) resource corresponding to a selected PRACH Occasion and preamble index.

In one embodiment, when the first message is an Msg1, the first message only comprises a PRACH Preamble.

In one embodiment, the target information block is used for configuring a unified TCI.

In one embodiment, the target information block is used for configuring a TCI of a PDCCH and a Physical Downlink Shared Channel (PDSCH).

In one embodiment, the target information block is used for configuring a TCI of a Physical Uplink Control Channel (PUCCH) and a PUSCH.

In one embodiment, the target information block is used for configuring a TCI of a PDCCH and a PUCCH.

In one embodiment, the target information block is used for configuring a TCI of a PDSCH and a PUSCH.

In one embodiment, the target information block is used for configuring a same TCI-StateId used by radio signals transmitted on multiple carriers.

In one embodiment, the target information block is used for configuring a TCI-StateId corresponding to a same index used by radio signals transmitted on multiple carriers.

In one embodiment, the target information block is used for configuring a unified TCI, and the target information block is carried by a last received signaling among multiple signalings configured with a unified TCI that become effective before the first message is transmitted.

In one embodiment, the target information block is a last received configuration signaling among multiple configuration signalings having been received for configuring a unified TCI, where the configured TCI becomes effective before the first message is transmitted.

In one embodiment, the target information block is used for configuring a unified TCI, and the target information block is carried by a last effective signaling among multiple signalings configured with a unified TCI that become effective before the first message is transmitted.

In one embodiment, the target information block is a last effective configuration signaling among multiple configuration signalings having been received for configuring a unified TCI, where the configured TCI becomes effective before the first message is transmitted.

In one embodiment, the first identity and the second identity are different.

In one embodiment, the first identity occupies 16 bits.

In one embodiment, the second identity occupies 16 bits.

In one embodiment, the first identity is associated with a serving cell.

In one embodiment, the second identity is not associated with any serving cell.

In one embodiment, the first identity is a PCI.

In one embodiment, the second identity is a PCI.

In one embodiment, the first identity is a PCI of a serving cell.

In one embodiment, the second identity is different from a PCI of a serving cell.

In one embodiment, one of the first identity and the second identity is a PCI, and the other is one of a ServCellIndex, a ServCellId or a ServCellIdentity.

Embodiment 2

Embodiment 2 illustrates a schematic diagram of a network architecture, as shown in FIG. 2.

FIG. 2 is a diagram illustrating a network architecture 200 of 5G NR, Long-Term Evolution (LIE) and Long-Term Evolution Advanced (LIE-A) systems. The 5G NR or LIE network architecture 200 may be called an Evolved Packet System (EPS) 200 or other suitable terminology. The EPS 200 may comprise one UE 201, an NR-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present application can be extended to networks providing circuit switching services or other cellular networks. The NR-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP)

phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present application.

In one embodiment, the UE 201 supports updating QCL relation with dynamic signaling.

In one embodiment, the UE 201 supports a unified TCI configuration.

In one embodiment, the UE 201 can receive CSI-RSs from multiple TRPs simultaneously.

In one embodiment, the UE 201 can receive SSBs from multiple TRPs simultaneously.

In one embodiment, the UE 201 is a terminal capable of monitoring multiple beams simultaneously.

In one embodiment, the UE 201 is a terminal supporting Massive-MIMO.

In one embodiment, the UE 201 supports 2-step random access.

In one embodiment, the UE 201 supports 2-step random access and 4-step random access at the same time.

In one embodiment, the gNB 203 corresponds to the second node in the present application.

In one embodiment, the gNB 203 supports updating QCL relation with dynamic signaling.

In one embodiment, the gNB 203 supports a unified TCI configuration.

In one embodiment, the gNB 203 can receive CSI-RSs from multiple TRPs simultaneously.

In one embodiment, the gNB 203 can receive SSBs from multiple TRPs simultaneously.

In one embodiment, the gNB 203 is a terminal capable of monitoring multiple beams simultaneously.

In one embodiment, the gNB 203 is a terminal supporting Massive-MIMO.

In one embodiment, the gNB 203 supports 2-step random access.

In one embodiment, the gNB 203 supports 2-step random access and 4-step random access at the same time.

In one embodiment, the first node in the present application corresponds to the UE 201, and the second node in the present application corresponds to the gNB 203.

Embodiment 3

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), is represented by three layers, which are a layer 1, a layer 2 and a layer 3, respectively. The layer 1 (L1) is the lowest layer which performs signal processing functions of various PHY layers. The L1 is called PHY 301 in the present application. which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between the first communication node and the second communication node via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and also provides support for handover of a second communication node between first communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The Radio Resource Control (RRC) sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the PDCP 304 of the second communication node is used for generating scheduling of the first communication node.

In one embodiment, the PDCP 354 of the second communication node is used for generating scheduling of the first communication node.

In one embodiment, the target information block is generated by the MAC 302 or the MAC 352.

In one embodiment, the target information block is generated by the PHY 301 or the PHY 351.

In one embodiment, the first message is generated by the MAC 302 or the MAC 352.

In one embodiment, the first message is generated by the PHY 301 or the PHY 351.

In one embodiment, the first signaling is generated by the MAC 302 or the MAC 352.

In one embodiment, the first signaling is generated by the PHY 301 or the PHY 351.

In one embodiment, the second signaling is generated by the MAC 302 or the MAC 352.

In one embodiment, the second signaling is generated by the PHY 301 or the PHY 351.

In one embodiment, the first signal is generated by the MAC 302 or the MAC 352.

In one embodiment, the first signal is generated by the PHY 301 or the PHY 351.

In one embodiment, the first signal is generated by the RRC 306.

In one embodiment, the first information block is generated by the RRC 306.

In one embodiment, the first information block is generated by the MAC 302 or the MAC 352.

In one embodiment, the second information block is generated by the RRC 306.

In one embodiment, the second information block is generated by the MAC 302 or the MAC 352.

In one embodiment, the first node is a terminal.

In one embodiment, the first node is a relay.

In one embodiment, the second node is a relay.

In one embodiment, the second node is a base station.

In one embodiment, the second node is a gNB.

In one embodiment, the second node is a Transmitter Receiver Point (TRP).

In one embodiment, the second node is used for managing multiple TRPs.

In one embodiment, the second node is used for managing multiple nodes of cells.

In one embodiment, the second node is used for managing multiple nodes of carriers.

Embodiment 4

Figure 4:
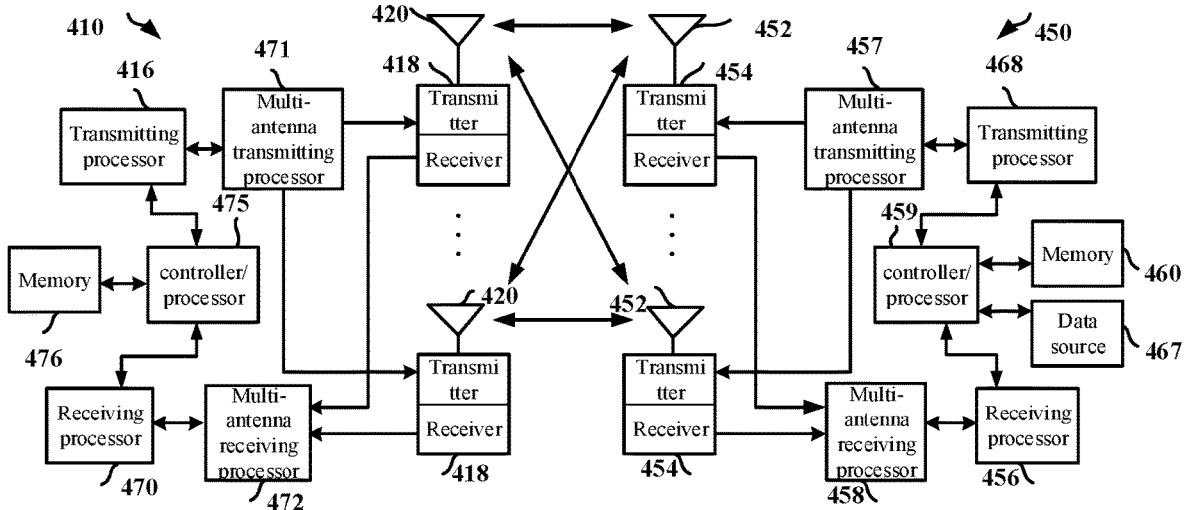
FIG. 4 illustrates a schematic diagram of a first communication device and a second communication device according to one embodiment of the present application.

Embodiment 4 illustrates a schematic diagram of a first communication device and a second communication device according to the present application, as shown in FIG. 4.

FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any spatial stream targeting the first communication device 450. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory, the at least one memory comprises computer program codes; the at least one memory and the computer program codes are configured to be used in collaboration with the at least one processor. The first communication device 450 at least: first receives a target information block, the target information block being generated in a protocol layer below a Radio Resource Control (RRC) layer, the target information block being used to determine a first time-frequency resource; and then performs a first random access procedure, the action of performing the first random access procedure comprising transmitting a first message; the first time-frequency resource is associated with one of a first identity and a second identity; the first message is used for random access; whether the first time-frequency resource is associated with the first identity is used to determine whether the first message is a Message A (MsgA) or a Message 1 (Msg1); the first identity and the second identity are both non-negative integers; at least one of the first identity or the second identity is a physical cell identifier (PCI).

In one embodiment, the first communication node 450 comprises a memory that stores a computer readable instruction program, the computer readable instruction program generates actions when executed by at least one processor, which include: first receiving a target information block, the target information block being generated in a protocol layer below a Radio Resource Control (RRC) layer, the target information block being used to determine a first time-frequency resource; and then performing a first random access procedure, the action of performing the first random access procedure comprising transmitting a first message; the first time-frequency resource is associated with one of a first identity and a second identity; the first message is used for random access; whether the first time-frequency resource is associated with the first identity is used to determine whether the first message is a Message A (MsgA) or a Message 1 (Msg1); the first identity and the second identity are both non-negative integers; at least one of the first identity or the second identity is a physical cell identifier (PCI).

In one embodiment, the second communication device 410 comprises at least one processor and at least one memory, the at least one memory comprises computer program codes; the at least one memory and the computer program codes are configured to be used in collaboration with the at least one processor. The second communication device 410 at least: first transmits a target information block, the target information block being generated in a protocol layer below a Radio Resource Control (RRC) layer, the target information block being used to determine a first time-frequency resource; and then performs a first random access procedure, the action of performing the first random access procedure comprising receiving a first message; the first time-frequency resource is associated with one of a first identity and a second identity; the first message is used for random access; whether the first time-frequency resource is associated with the first identity is used to determine whether the first message is a Message A (MsgA) or a Message 1 (Msg1); the first identity and the second identity are both non-negative integers; at least one of the first identity or the second identity is a physical cell identifier (PCI).

In one embodiment, the second communication device 410 comprises a memory that stores a computer readable instruction program, the computer readable instruction program generates actions when executed by at least one processor, which include: first transmitting a target information block, the target information block being generated in a protocol layer below a Radio Resource Control (RRC) layer, the target information block being used to determine a first time-frequency resource; and then performing a first random access procedure, the action of performing the first random access procedure comprising receiving a first message; the first time-frequency resource is associated with one of a first identity and a second identity; the first message is used for random access; whether the first time-frequency resource is associated with the first identity is used to determine whether the first message is a Message A (MsgA) or a Message 1 (Msg1); the first identity and the second identity are both non-negative integers; at least one of the first identity or the second identity is a physical cell identifier (PCI).

In one embodiment, the first communication device 450 corresponds to the first node in the present application.

In one embodiment, the second communication device 410 corresponds to the second node in the present application.

In one embodiment, the first communication device 450 is a UE.

In one embodiment, the first communication device 450 is a terminal.

In one embodiment, the first communication device 450 is a relay.

In one embodiment, the second communication device 410 is a base station.

In one embodiment, the second communication device 410 is a relay.

In one embodiment, the second communication device 410 is network equipment.

In one embodiment, the second communication device 410 is a serving cell.

In one embodiment, the second communication device 410 is a TRP.

In one embodiment, at least the first four of the antenna 452, the receiver 454, the multi-antenna receiving processor 458, the receiving processor 456, and the controller/processor 459 are used for receiving a target information block; at least the first four of the antenna 420, the transmitter 418, the multi-antenna transmitting processor 471, the transmitting processor 416 and the controller/processor 475 are used for transmitting a target information block.

In one embodiment, at least the first four of the antenna 452, the transmitter 454, the multi-antenna transmitting processor 457, the transmitting processor 468 and the controller/processor 459 are used for transmitting a first message; at least the first four of the antenna 420, the receiver 418, the multi-antenna receiving processor 472, the receiving processor 470 and the controller/processor 475 are used for receiving a first message.

In one embodiment, at least the first four of the antenna 452, the receiver 454, the multi-antenna receiving processor 458, the receiving processor 456, and the controller/processor 459 are used for receiving a first signaling; at least the first four of the antenna 420, the transmitter 418, the multi-antenna transmitting processor 471, the transmitting processor 416 and the controller/processor 475 are used for transmitting a first signaling.

In one embodiment, at least the first four of the antenna 452, the receiver 454, the multi-antenna receiving processor 458, the receiving processor 456, and the controller/processor 459 are used for performing channel measurement on a first signal to determine a first measurement value; at least the first four of the antenna 420, the transmitter 418, the multi-antenna transmitting processor 471, the transmitting processor 416 and the controller/processor 475 are used for transmitting a first signal.

In one embodiment, at least the first four of the antenna 452, the receiver 454, the multi-antenna receiving processor 458, the receiving processor 456, and the controller/processor 459 are used for receiving a first information block; at least the first four of the antenna 420, the transmitter 418, the multi-antenna transmitting processor 471, the transmitting processor 416 and the controller/processor 475 are used for transmitting a first information block.

In one embodiment, at least the first four of the antenna 452, the receiver 454, the multi-antenna receiving processor 458, the receiving processor 456, and the controller/processor 459 are used for receiving a second information block; at least the first four of the antenna 420, the transmitter 418, the multi-antenna transmitting processor 471, the transmitting processor 416 and the controller/processor 475 are used for transmitting a second information block.

In one embodiment, at least the first four of the antenna 452, the receiver 454, the multi-antenna receiving processor 458, the receiving processor 456, and the controller/processor 459 are used for receiving a second signaling; at least the first four of the antenna 420, the transmitter 418, the multi-antenna transmitting processor 471, the transmitting processor 416 and the controller/processor 475 are used for transmitting a second signaling.

Embodiment 5

Figure 5:
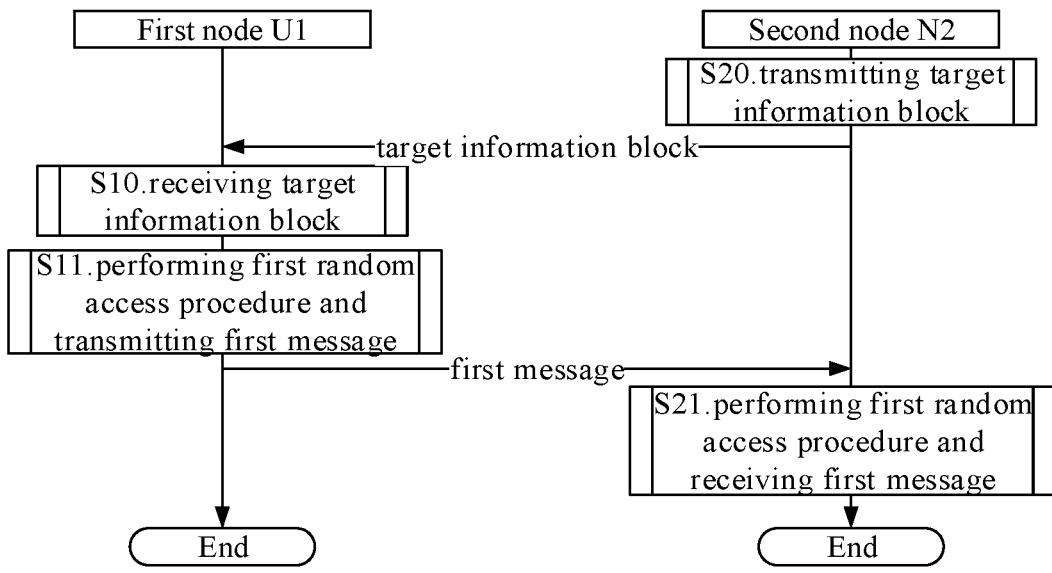
FIG. 5 illustrates a flowchart of a target information block according to one embodiment of the present application.

Embodiment 5 illustrates a flowchart of a target information block, as shown in FIG. 5. In FIG. 5, a first node U1 and a second node N2 are in communication via a radio link. It should be particularly noted that the sequence illustrated herein does not set any limit to the signal transmission order or implementation order in the present application. In case of no conflict, the embodiments, subembodiments, and subsidiary embodiments in Embodiment 5 can be applied to Embodiments 6, 7, 8 and 9; reversely, in case of no conflict, the embodiments, subembodiments, and subsidiary embodiments in Embodiments 6, 7, 8 and 9 can be applied to Embodiment 5.

The first node U1 receives a target information block in step S10; and performs a first random access procedure and transmits a first message in step S11.

The second node N2 transmits a target information block in step S20; and performs a first random access procedure and receives a first message in step S21.

In Embodiment 5, the target information block being generated in a protocol layer below a Radio Resource Control (RRC) layer, the target information block being used to determine a first time-frequency resource; and the action of performing the first random access procedure comprises transmitting a first message; the first time-frequency resource is associated with one of a first identity and a second identity; the first message is used for random access; whether the first time-frequency resource is associated with the first identity is used to determine whether the first message is a Message A (MsgA) or a Message 1 (Msg1); the first identity and the second identity are both non-negative integers; at least one of the first identity or the second identity is a physical cell identifier (PCI).

In one embodiment, the first random access procedure is performed on a first BWP, a mch-ConfigDedicated used for configuring the first BWP provides contention-free 2-step RA type random access resources but does not provide contention-free 4-step RA type random access resources.

Typically, the first random access procedure is used for reconfiguration with sync.

Typically, when the first time-frequency resource is not associated with the first identity, the first message is an Msg1; when the first time-frequency resource is associated with the first identity, the first message is an MsgA.

In one embodiment, when the first time-frequency resource is not associated with the first identity, the first random access procedure is contention-based.

In one embodiment, a radio signal bearing the first message and a radio signal transmitted in the first time-frequency resource are QCL.

In one embodiment, a spatial Reception (Rx) parameter of a radio signal transmitted in the first time-frequency resource is used to determine a spatial Transmission (Tx) parameter of a radio signal bearing the first message.

In one embodiment, the spatial Rx parameter comprises an analog beamforming vector.

In one embodiment, the spatial Rx parameter comprises a digital beamforming vector.

In one embodiment, the spatial Rx parameter comprises a spatial filter parameter.

In one embodiment, the QCL refers to being Quasi Co-Located.

In one embodiment, the QCL refers to Quasi Co-Location.

In one embodiment, the QCL comprises a QCL parameter.

In one embodiment, the QCL comprises a QCL assumption.

In one embodiment, the QCL type includes QCL-Type A.

In one embodiment, the QCL type includes QCL-Type B.

In one embodiment, the QCL type includes QCL-Type C.

In one embodiment, the QCL type includes QCL-Type D.

Embodiment 6

Figure 6:
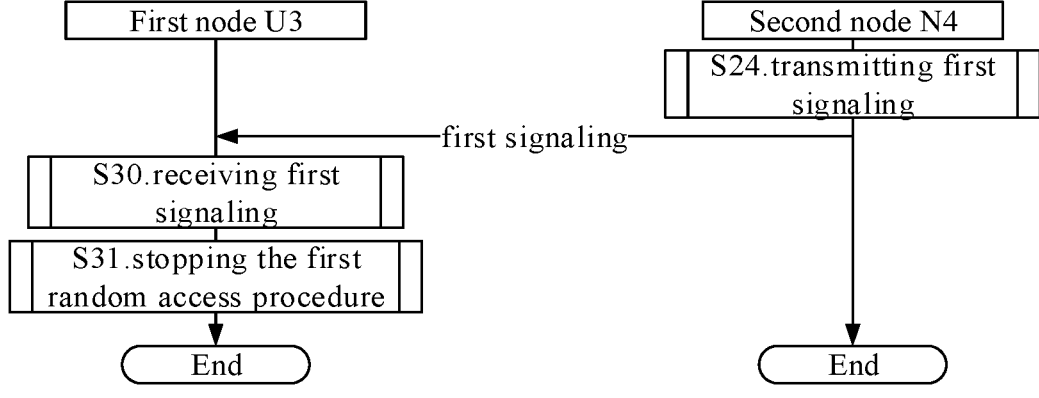
FIG. 6 illustrates a flowchart of a first signaling according to one embodiment of the present application.

Embodiment 6 illustrates a flowchart of a first signaling, as shown in FIG. 6. In FIG. 6, a first node U3 and a second node N4 are in communication via a radio link. It should be particularly noted that the sequence illustrated herein does not set any limit to the signal transmission order or implementation order in the present application. In case of no conflict, the embodiments, subembodiments, and subsidiary embodiments in Embodiment 6 can be applied to Embodiments 5, 7, 8 and 9; reversely, in case of no conflict, the embodiments, subembodiments, and subsidiary embodiments in Embodiments 5, 7, 8 and 9 can be applied to Embodiment 6.

The first node U3 receives a first signaling in step S30; and stops the first random access procedure in step S31.

The second node N4 transmits a first signaling in step S40.

In Embodiment 6, the first signaling is used to indicate a second time-frequency resource, the second time-frequency resource being associated with the second identity; and as a response to receiving the first signaling, stopping the first random access procedure; the first time-frequency resource is associated with the first identity, the first message being an MsgA; the action of performing the first random access procedure comprises monitoring a second signaling in a first search space; the second signaling is used for scheduling a response to the first message; the action of stopping the first random access procedure comprises stopping monitoring the second signaling.

In one embodiment, a physical layer channel occupied by the first signaling includes a PDCCH.

In one embodiment, the first signaling is DCI.

In one embodiment, the first signaling is a MAC CE.

In one embodiment, the first signaling is used to indicate a unified TCI.

In one embodiment, the second time-frequency resource occupies more than one Resource Element (RE).

In one embodiment, the second time-frequency resource is used for transmitting a CSI-RS.

In one embodiment, the second time-frequency resource is used for transmitting a reference signal.

In one embodiment, the second time-frequency resource is a CSI resource.

In one embodiment, the second time-frequency resource is a NZP CSI-RS resource, or the second time-frequency resource is a Synchronization Signal/Physical Broadcast CHannel block (SSB) indicated by an ssb-Index.

In one embodiment, the first signaling is used for indicating time-frequency resources occupied by the second time-frequency resource.

In one embodiment, the first signaling is used to indicate a CSI-ResourceConfigId used by a reference signal transmitted in the second time-frequency resource.

In one embodiment, the first signaling is used to indicate an identity used by a reference signal transmitted in the second time-frequency resource.

In one embodiment, the first signaling is used to indicate an index used by a reference signal transmitted in the second time-frequency resource.

In one embodiment, the second time-frequency resource is associated with a TCI.

In one embodiment, the second time-frequency resource is associated with a TCI-State.

In one embodiment, the second time-frequency resource is associated with a TCI-StateId.

In one embodiment, the meaning of the phrase that the second time-frequency resource is associated with the second identity comprises: an RRC signaling configuring the second time-frequency resource comprises the second identity.

In one embodiment, the meaning of the phrase that the second time-frequency resource is associated with the second identity comprises: a reference signal (RS) in the second time-frequency resource is transmitted by a TRP corresponding to the second identity.

In one subembodiment, the meaning of the phrase that the second time-frequency resource is associated with the second identity comprises: the second time-frequency resource is maintained by a TRP corresponding to the second identity.

In one subembodiment, the meaning of the phrase that the second time-frequency resource is associated with the second identity comprises: a reference signal (RS) transmitted in the second time-frequency resource is scrambled by the second identity.

In one subembodiment, the meaning of the phrase that the second time-frequency resource is associated with the second identity comprises: the second identity is used for generating a reference signal (RS) transmitted in the second time-frequency resource.

In one subembodiment, the meaning of the phrase that the second time-frequency resource is associated with the second identity comprises: there is an explicit signaling indicating that the second time-frequency resource and the second identity are associated.

Typically, the action of stopping the first random access procedure includes stopping a msgB-ResponseWindow for the first message.

Typically, the first signaling is received before the first random access procedure is successfully completed.

Typically, the first signaling is received before the second signaling is detected.

In one embodiment, a physical layer channel occupied by the second signaling includes a PDCCH.

In one embodiment, the second signaling comprises DCI.

In one embodiment, the second signaling is used for scheduling a PDSCH.

In one embodiment, the second signaling is used for scheduling an MsgB.

In one embodiment, the first random access procedure is triggered by consistent Listen Before Talk (LBT) failures.

In one subembodiment, the first random access procedure is performed on a first BWP, and consistent LBT failures are used for initiating a handover towards the first BWP.

In one subembodiment, the first node triggers the consistent LBT failures on a second BWP before performing the first random access procedure, where the second BWP is different from the first BWP, and the second BWP and the first BWP belong to a same carrier.

In one embodiment, the first search space is a ra-SearchSpace.

In one embodiment, a PDCCH candidate in the first search space is at least identified by a Random Access Radio Network Temporary Identifier (RA-RNTI).

In one subembodiment, when the first time-frequency resource is associated with the second identity, a PDCCH candidate in the first search space is at least identified by a RA-RNTI.

In one embodiment, a PDCCH candidate in the first search space is at least identified by a Message B Radio Network Temporary Identifier (MsgB-RNTI).

In one subembodiment, when the first time-frequency resource is associated with the first identity, a PDCCH candidate in the first search space is at least identified by a MsgB-RNTI.

In one embodiment, the first search space is a Type1-PDCCH CSS set.

In one embodiment, the first random access procedure is used for a Scheduling Request (SR), and the action of stopping the first random access procedure does not comprise cancelling an SR used to trigger the first random access procedure.

Typically, the SR used for triggering the first random access procedure is still pending after the action of stopping the first random access procedure.

In one embodiment, the step S30 is taken after the step S11 in Embodiment 5.

In one embodiment, the step S40 is taken after the step S21 in Embodiment 5.

Embodiment 7

Figure 7:
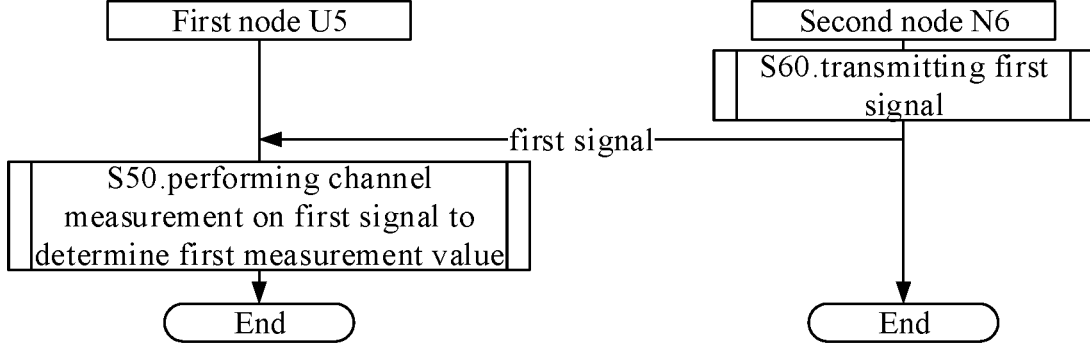
FIG. 7 illustrates a flowchart of a first signal according to one embodiment of the present application.

Embodiment 7 illustrates a flowchart of a first signal, as shown in FIG. 7. In FIG. 7, a first node U5 and a second node N6 are in communication via a radio link. It should be particularly noted that the sequence illustrated herein does not set any limit to the signal transmission order or implementation order in the present application. In case of no conflict, the embodiments, subembodiments, and subsidiary embodiments in Embodiment 7 can be applied to Embodiments 5, 6, 8 and 9; reversely, in case of no conflict, the embodiments, subembodiments, and subsidiary embodiments in Embodiments 5, 6, 8 and 9 can be applied to Embodiment 7.

The first node U5 performs a channel measurement on a first signal in step S50 to determine a first measurement value.

The second node N6 transmits a first signal in step S60.

In Embodiment 7, the first time-frequency resource is associated with the first signal, and whether the first measurement value is above a first threshold is used to determine whether the first message is an MsgA or an Msg1.

Typically, the first node is provided simultaneously with 2-step RA type random access resources and 4-step RA type random access resources.

Typically, when the first measurement value is above the first threshold, the first message is an MsgA.

Typically, when the first measurement value isn't above the first threshold, the first message is an Msg1.

Typically, only when the first time-frequency resource is associated with the first identity, whether the first measurement value is above a first threshold is used to determine whether the first message is an Msg1 or an MsgA.

In one embodiment, the first signal and a radio signal transmitted in the first time-frequency resource are QCL.

In one embodiment, the first signal comprises an SSB.

In one embodiment, the first signal comprises a CSI-RS.

In one embodiment, the first signal is a radio signal.

In one embodiment, the first signal is a baseband signal.

In one embodiment, the first measurement value is a Reference Signal Received Power (RSRP).

In one embodiment, the first measurement value is a Reference Signal Received Quality (RSRQ).

In one embodiment, the first measurement value is a Signal-to-noise ratio (SNR).

In one embodiment, the first measurement value is a Signal to Interference plus Noise Ratio (SINR).

In one embodiment, the first measurement value is measured in dB.

In one embodiment, the first measurement value is measured in dBm.

In one embodiment, the step S50 is after the step S10 and before the step S11 in Embodiment 5.

In one embodiment, the step S60 is after the step S20 and before the step S21 in Embodiment 5.

In one embodiment, the step S50 is taken before the step S10 in Embodiment 5.

In one embodiment, the step S60 is taken before the step S20 in Embodiment 5.

Embodiment 8

Figure 8:
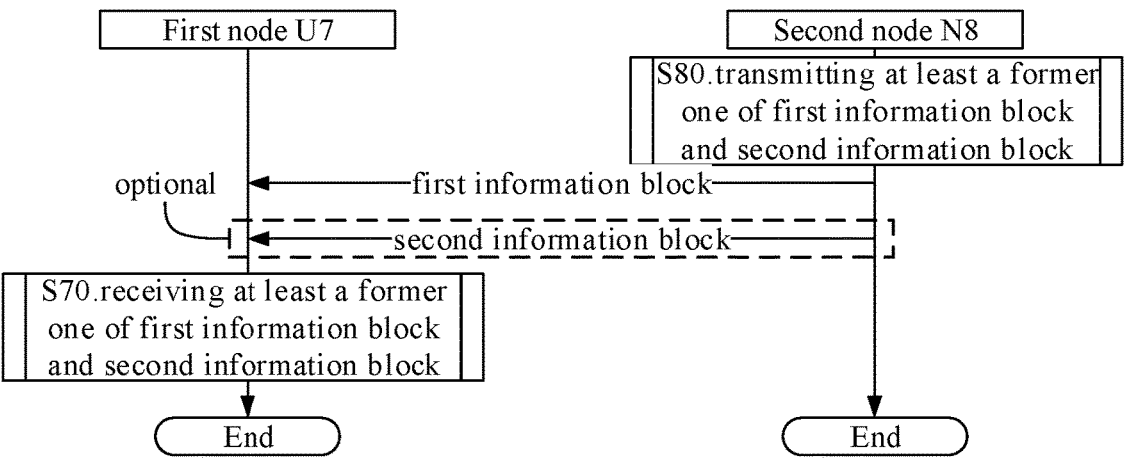
FIG. 8 illustrates a flowchart of a first information block and a second information block according to one embodiment of the present application.

Embodiment 8 illustrates a flowchart of a first information block and a second information block, as shown in FIG. 8.

In FIG. 8, a first node U7 and a second node N8 are in communications via a radio link, where the section marked by the dotted-line box is optional. It should be particularly noted that the sequence illustrated herein does not set any limit to the signal transmission order or implementation order in the present application. In case of no conflict, the embodiments, subembodiments, and subsidiary embodiments in Embodiment 8 can be applied to Embodiments 5, 6, 7 and 9; reversely, in case of no conflict, the embodiments, subembodiments, and subsidiary embodiments in Embodiments 5, 6, 7 and 9 can be applied to Embodiment 8.

The first node U7 receives at least a former one of a first information block and a second information block in step S70.

The second node N8 transmits at least a former one of a first information block and a second information block in step S80.

In Embodiment 8, the first information block is used to determine a first candidate time-frequency resource set, while the second information block is used to determine a second candidate time-frequency resource set; when the first message is an MsgA, time-frequency resources occupied by the first message belong to the first candidate time-frequency resource set; when the first message is an Msg1, time-frequency resources occupied by the first message belong to the second candidate time-frequency resource set.

In one embodiment, the second node only transmits the first information block.

In one embodiment, the second node transmits the first information block and the second information block.

In one embodiment, the first node only receives the first information block.

In one embodiment, the first node receives the first information block and the second information block.

In one embodiment, the first information block is transmitted through an RRC signaling.

In one embodiment, the name of an RRC signaling transmitting the first information block includes 2-Step.

In one embodiment, the name of an RRC signaling transmitting the first information block includes MsgA.

In one embodiment, the first information block comprises a msgA-prach-ConfigurationIndex IE.

In one embodiment, the first information block comprises a ra-PreambleIndex IE.

In one embodiment, the first information block comprises a pmch-ConfigurationIndex IE.

In one embodiment, the first information block comprises a ra-OccasionList IE.

In one embodiment, the first information block comprises a msgA-PUSCH-ResourceGroupA IE.

In one embodiment, the first information block comprises a msgA-PUSCH-ResourceGroupB IE.

In one embodiment, the first information block comprises a msgA-PUSCH-resource-Index IE.

In one embodiment, the first information block comprises one or more fields in a RACH-ConfigCommon.

In one embodiment, the first information block comprises one or more fields in a RACH-ConfigCommonTwoStepRA.

In one embodiment, the first information block comprises one or more fields in a RACH-ConfigDedicated.

In one embodiment, the first information block comprises one or more fields in a RACH-ConfigGeneric.

In one embodiment, the first information block comprises one or more fields in a RACH-ConfigGenericTwoStepRA.

In one embodiment, the second information block is transmitted through an RRC signaling.

In one embodiment, the name of an RRC signaling transmitting the second information block includes 4-Step.

In one embodiment, the second information block comprises a prach-ConfigurationIndex IE.

In one embodiment, the second information block comprises a ra-PreambleIndex IE.

In one embodiment, the second information block comprises a ra-OccasionList IE.

In one embodiment, the second information block comprises one or more fields in a RACH-ConfigCommon.

In one embodiment, the second information block comprises one or more fields in a RACH-ConfigDedicated.

In one embodiment, the second information block comprises one or more fields in a RACH-ConfigGeneric.

In one embodiment, the first candidate time-frequency resource set comprises multiple PRACH Occasions.

In one embodiment, the second candidate time-frequency resource set comprises multiple PRACH Occasions.

In one embodiment, the first candidate time-frequency resource set comprises multiple Preamble Indexes.

In one embodiment, the second candidate time-frequency resource set comprises multiple Preamble Indexes.

In one embodiment, the step S70 is taken before the step S10 in Embodiment 5.

In one embodiment, the step S80 is taken before the step S20 in Embodiment 5.

Embodiment 9

Figure 9:
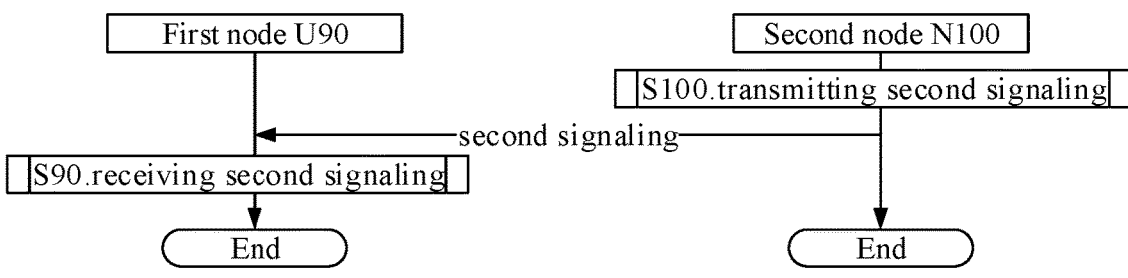
FIG. 9 illustrates a flowchart of a second signaling according to one embodiment of the present application.

Embodiment 9 illustrates a flowchart of a second signaling, as shown in FIG. 9. In FIG. 9, a first node U9 and a second node N10 are in communications via a radio link, where the section marked by the dotted-line box is optional. It should be particularly noted that the sequence illustrated herein does not set any limit to the signal transmission order or implementation order in the present application. In case of no conflict, the embodiments, subembodiments, and subsidiary embodiments in Embodiment 9 can be applied to Embodiments 5, 6, 7 and 8; reversely, in case of no conflict, the embodiments, subembodiments, and subsidiary embodiments in Embodiments 5, 6, 7 and 8 can be applied to Embodiment 9.

The first node U9 receives a second signaling in step S90.

The second node N10 transmits a second signaling in step S100.

In Embodiment 9, the second signaling is used to schedule a response to the first message; a Cyclic Redundancy Check (CRC) comprised in the second signaling is scrambled by a first Radio Network Temporary Identifier (RNTI), the first RNTI being related to time-frequency resources occupied by the first message; whether a first integer is used to determine the first RNTI is related to whether the first message is an MsgA or an Msg1, the first integer being fixed or the first integer being configured via an RRC signaling.

In one embodiment, when the first message is an MsgA, the first integer is not used to determine the first Radio Network Temporary Identifier (RNTI).

In one embodiment, when the first message is an MsgA, the second signaling is used for scheduling an MsgB.

In one embodiment, when the first message is an Msg1, the first integer is used to determine the first Radio Network Temporary Identifier (RNTI).

In one embodiment, when the first message is an Msg1, the second signaling is used for scheduling an Msg2.

In one embodiment, when the first message is an Msg1, the second signaling is used for scheduling a Random Access Response (RAR).

In one embodiment, a physical layer channel occupied by the second signaling includes a PDCCH.

In one embodiment, the second signaling comprises DCI.

In one embodiment, the first RNTI is linear with the first integer.

In one embodiment, the first RNTI is a RA-RNTI.

In one embodiment, when the first message is an Msg1, the first RNTI is determined according to the following formula:

First $RNTI=1+s\_id+14 \times t\_id+14 \times 80 \times f\_id+14 \times 80 \times 8 \times ul\_carrier\_id+first$ integer;

herein, for any parameter other than the first integer, refer to the way of generating RA-RNTI given in TS 38.321.

In one subembodiment, the way of generating RA-RNTI can be found in TS 38.321, Section 5.1.3.

In one embodiment, the first RNTI is linear with an index corresponding to a first OFDM symbol occupied by a PRACH Occasion occupied by the first message.

In one embodiment, the first RNTI is linear with an index corresponding to a first slot occupied by a PRACH Occasion occupied by the first message in a System Frame (SF).

In one subembodiment, a linear coefficient between the first RNTI and an index corresponding to a first slot occupied by a PRACH Occasion occupied by the first message in a System Frame (SF) is equal to 14.

In one embodiment, the first RNTI is linear with an index of a PRACH Occasion occupied by the first message in frequency domain.

In one subembodiment, a linear coefficient between the first RNTI and an index of a PRACH Occasion occupied by the first message in frequency domain is equal to a product of 14 and 80.

In one embodiment, the first RNTI is linear with a first coefficient, the first coefficient being related to a type of an uplink carrier occupied by the first message.

In one subembodiment, the type of the uplink carrier occupied by the first message is NUL and the first coefficient is equal to 0; or the type of the uplink carrier occupied by the first message is SUL and the first coefficient is equal to 1.

In one subembodiment, a linear coefficient between the first RNTI and the first coefficient is equal to 8960.

In one embodiment, the step S90 is taken after the step S11 in Embodiment 5.

In one embodiment, the step S100 is taken after the step S21 in Embodiment 5.

Embodiment 10

Figure 10:
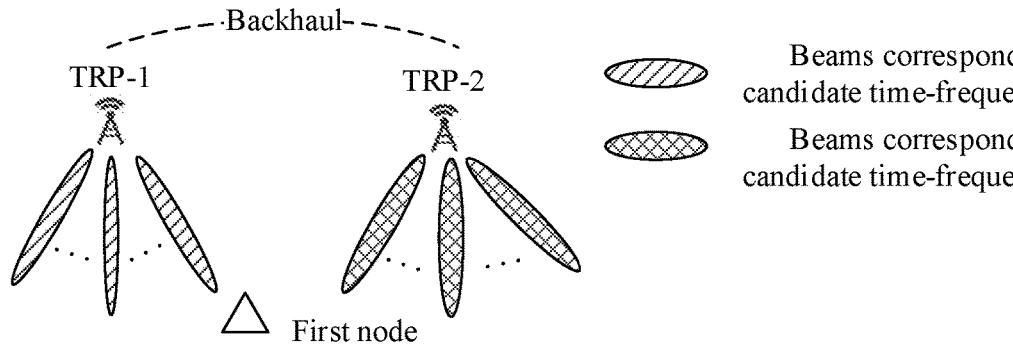
FIG. 10 illustrates a schematic diagram of an application scenario according to one embodiment of the present application.

Embodiment 10 illustrates a schematic of an application scenario, as shown in FIG. 10. The TRP-1 and TRP-2 shown in FIG. 10 are both managed by the second node in the present application; or the TRP-1 shown is managed by the second node in the present application and the TRP-2 shown is managed by a neighbor base station of the second node; the first identity in the present application is associated with the TRP-1, while the second identity in the present application is associated with the TRP-2; the first node moves within the coverage of the TRP-1 and the coverage of the TRP-2.

The TRP-1 shown in FIG. 10 maintains a third candidate time-frequency resource set, the third candidate time-frequency resource set comprising K1 candidate time-frequency resources; the TRP-2 shown in FIG. 10 maintains a fourth candidate time-frequency resource set, the fourth candidate time-frequency resource set comprising K2 candidate time-frequency resources; the first time-frequency resource is one of the K1 candidate time-frequency resources, or the first time-frequency resource is one of the K2 candidate time-frequency resources; K1 and K2 are both positive integers greater than 1.

In one embodiment, the K1 candidate time-frequency resources respectively correspond to K1 TCI-StateIds.

In one embodiment, the K1 candidate time-frequency resources are associated with the first identity.

In one embodiment, TCI-StateIds associated with the K1 candidate time-frequency resources can be used for 2-step random access procedure.

In one embodiment, the K2 candidate time-frequency resources respectively correspond to K2 TCI-StateIds.

In one embodiment, the K2 candidate time-frequency resources are associated with the second identity.

In one embodiment, TCI-StateIds associated with the K2 candidate time-frequency resources cannot be used for 2-step random access procedure.

In one embodiment, between the TRP-1 and the TRP-2 there exists a Backhaul Link.

Embodiment 11

Figure 11:
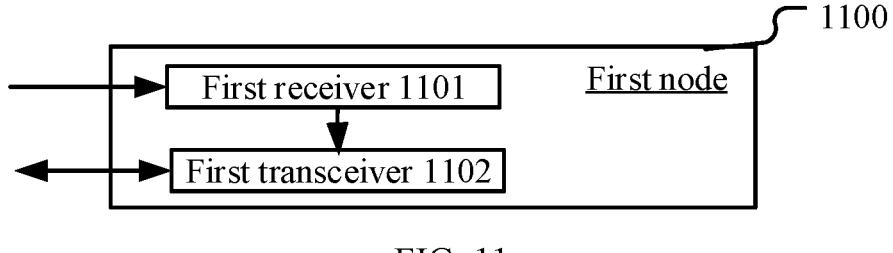
FIG. 11 illustrates a structure block diagram of a processing device in a first node according to one embodiment of the present application.

Embodiment 11 illustrates a structure block diagram of a first node, as shown in FIG. 11. In FIG. 11, a first node 1100 comprises a first receiver 1101 and a first transceiver 1102.

The first receiver 1101 receives a target information block, the target information block being generated in a protocol layer below a Radio Resource Control (RRC) layer, the target information block being used to determine a first time-frequency resource; and the first transceiver 1102 performs a first random access procedure, the action of performing the first random access procedure comprising transmitting a first message.

In Embodiment 11, the first time-frequency resource is associated with one of a first identity and a second identity; the first message is used for random access; whether the first time-frequency resource is associated with the first identity is used to determine whether the first message is a Message A (MsgA) or a Message 1 (Msg1); the first identity and the second identity are both non-negative integers; at least one of the first identity or the second identity is a physical cell identifier (PCI).

In one embodiment, the first transceiver 1102 receives a first signaling, the first signaling being used to indicate a second time-frequency resource, the second time-frequency resource being associated with the second identity; and the first transceiver 1102, as a response to receiving the first signaling, stops the first random access procedure; the first time-frequency resource is associated with the first identity, the first message being an MsgA; the action of performing the first random access procedure comprises monitoring a second signaling in a first search space; the second signaling is used for scheduling a response to the first message; the action of stopping the first random access procedure comprises stopping monitoring the second signaling.

In one embodiment, the first random access procedure is used for a Scheduling Request (SR), and the action of stopping the first random access procedure does not comprise cancelling an SR used to trigger the first random access procedure.

In one embodiment, the first transceiver 1102 performs a channel measurement on a first signal to determine a first measurement value; the first time-frequency resource is associated with the first signal, and whether the first measurement value is above a first threshold is used to determine whether the first message is an MsgA or an Msg1.

In one embodiment, the first random access procedure is performed on a first BWP, a mch-ConfigDedicated used for configuring the first BWP provides contention-free 2-step RA type random access resources but does not provide contention-free 4-step RA type random access resources.

In one embodiment, the first receiver 1101 receives at least a former one of a first information block and a second information block; the first information block is used to determine a first candidate time-frequency resource set, while the second information block is used to determine a second candidate time-frequency resource set; when the first message is an MsgA, time-frequency resources occupied by the first message belong to the first candidate time-frequency resource set; when the first message is an Msg1, time-frequency resources occupied by the first message belong to the second candidate time-frequency resource set.

In one embodiment, the first transceiver 1102 receives a second signaling, the second signaling being used to schedule a response to the first message; a Cyclic Redundancy Check (CRC) comprised in the second signaling is scrambled by a first Radio Network Temporary Identifier (RNTI), the first RNTI being related to time-frequency resources occupied by the first message; whether a first integer is used to determine the first RNTI is related to whether the first message is an MsgA or an Msg1, the first integer being fixed or the first integer being configured via an RRC signaling.

Typically, when the first time-frequency resource is associated with the first identity, the first message is an MsgA, when the first time-frequency resource is associated with the second identity, the first message is an Msg1; the first message is used for random access; the first identity is a PCI corresponding to a serving cell, while the second identity is a PCI other than the PCI corresponding to the serving cell; the first identity and the second identity are different; the first time-frequency resource is associated with a first TCI, and a QCL parameter used by the first message is the first TCI.

In one embodiment, the first receiver 1101 comprises at least the first four of the antenna 452, the receiver 454, the multi-antenna receiving processor 458, the receiving processor 456 and the controller/processor 459 in Embodiment 4.

In one embodiment, the first transceiver 1102 comprises at least the first six of the antenna 452, the receiver/transmitter 454, the multi-antenna transmitting processor 457, the transmitting processor 468, the multi-antenna receiving processor 458, the receiving processor 456 and the controller/processor 459 in Embodiment 4.

Embodiment 12

Figure 12:
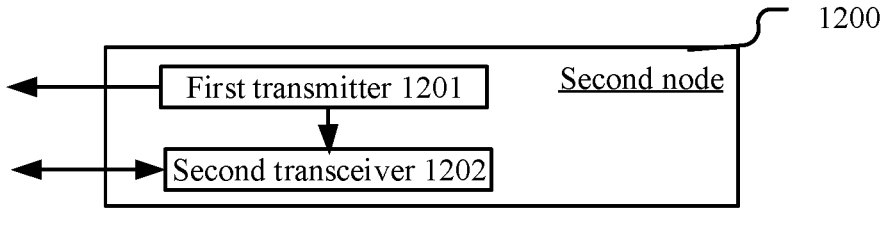
FIG. 12 illustrates a structure block diagram a processing device in a second node according to one embodiment of the present application.

Embodiment 12 illustrates a structure block diagram of a second node, as shown in FIG. 12. In FIG. 12, a second node 1200 comprises a first transmitter 1201 and a second transceiver 1202.

The first transmitter 1201 transmits a target information block, the target information block being generated in a protocol layer below an RRC layer, the target information block being used to determine a first time-frequency resource; and the second transceiver 1202 performs a first random access procedure, the action of performing the first random access procedure comprising receiving a first message.

In Embodiment 12, the first time-frequency resource is associated with one of a first identity and a second identity; the first message is used for random access; whether the first time-frequency resource is associated with the first identity is used to determine whether the first message is a Message A (MsgA) or a Message 1 (Msg1); the first identity and the second identity are both non-negative integers; at least one of the first identity or the second identity is a physical cell identifier (PCI).

In one embodiment, the second transceiver 1202 transmits a first signaling; the first signaling is used to indicate a second time-frequency resource, the second time-frequency resource being associated with the second identity; and the second transceiver 1202, as a response to transmitting the first signaling, stops the first random access procedure; the first time-frequency resource is associated with the first identity, the first message being an MsgA; the action of performing the first random access procedure comprises monitoring a second signaling in a first search space; the second signaling is used for scheduling a response to the first message; the action of stopping the first random access procedure comprises stopping monitoring the second signaling.

In one embodiment, the first random access procedure is used for a Scheduling Request (SR), and the action of stopping the first random access procedure does not comprise cancelling an SR used to trigger the first random access procedure.

In one embodiment, the second transceiver 1202 transmits a first signal; a channel measurement is performed on the first signal to determine a first measurement value; the first time-frequency resource is associated with the first signal, and whether the first measurement value is above a first threshold is used to determine whether the first message is an MsgA or an Msg1.

In one embodiment, the first random access procedure is performed on a first BWP, a mch-ConfigDedicated used for configuring the first BWP provides contention-free 2-step RA type random access resources but does not provide contention-free 4-step RA type random access resources.

In one embodiment, the first transmitter 1201 transmits at least a former one of a first information block and a second information block; the first information block is used to determine a first candidate time-frequency resource set, while the second information block is used to determine a second candidate time-frequency resource set; when the first message is an MsgA, time-frequency resources occupied by the first message belong to the first candidate time-frequency resource set; when the first message is an Msg1, time-frequency resources occupied by the first message belong to the second candidate time-frequency resource set.

In one embodiment, the second transceiver 1202 transmits a second signaling, the second signaling being used to schedule a response to the first message; a Cyclic Redundancy Check (CRC) comprised in the second signaling is scrambled by a first Radio Network Temporary Identifier (RNTI), the first RNTI being related to time-frequency resources occupied by the first message; whether a first integer is used to determine the first RNTI is related to whether the first message is an MsgA or an Msg1, the first integer being fixed or the first integer being configured via an RRC signaling.

Typically, when the first time-frequency resource is associated with the first identity, the first message is an MsgA, when the first time-frequency resource is associated with the second identity, the first message is an Msg1; the first message is used for random access; the first identity is a PCI corresponding to a serving cell, while the second identity is a PCI other than the PCI corresponding to the serving cell; the first identity and the second identity are different; the first time-frequency resource is associated with a first TCI, and a QCL parameter used by the first message is the first TCI.

In one embodiment, the first transmitter 1201 comprises at least the first four of the antenna 420, the transmitter 418, the multi-antenna transmitting processor 471, the transmitting processor 416 and the controller/processor 475 in Embodiment 4.

In one embodiment, the second transceiver 1202 comprises at least the first six of the antenna 420, the transmitter/receiver 418, the multi-antenna transmitting processor 471, the multi-antenna receiving processor 472, the transmitting processor 416, the receiving processor 470 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits.

Correspondingly, each module unit in the above embodiment may be realized in the form of hardware, or in the form of software function modules. The present application is not limited to any combination of hardware and software in specific forms. The first node in the present application includes but is not limited to mobile phones, tablet computers, notebooks, network cards, low-consumption equipment, enhanced MTC (eMTC) terminals, NB-IOT terminals, vehicle-mounted communication equipment, vehicles, automobiles, RSU, aircrafts, airplanes, unmanned aerial vehicles, telecontrolled aircrafts, etc. The second node in the present application includes but is not limited to macrocellular base stations, micro-cellular base stations, home base stations, relay base station, eNB, gNB, Transmitter Receiver Point (TRP), GNSS, relay satellite, satellite base station, airborne base station, RSU, unmanned anel vehicle, test equipment like transceiving device simulating partial functions of base station or signaling tester, and other radio communication equipment.

It will be appreciated by those skilled in the art that this application can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A terminal for wireless communications, the terminal comprising:

a transceiver; and a processor, wherein the transceiver and the processor are configured to:

receive a target information block that is generated in a protocol layer below a Radio Resource Control (RRC) layer, determine, based on the target information block, a first time-frequency resource associated with one of a first identity and a second identity, determine whether a first message is a Message A (MsgA) or a Message 1 (Msg1) based on whether the first time-frequency resource is associated with the first identity, receive at least one of a first information block and a second information block, determine a first candidate time-frequency resource set based on the first information block, determine a second candidate time-frequency resource set based on the second information block, transmit the first message used for random access, wherein on a condition that the first message is a MsgA, time-frequency resources occupied by the first message are associated with the first candidate time-frequency resource set, and wherein on a condition that the first message is a Msg1, time-frequency resources occupied by the first message are associated with the second candidate time-frequency resource set.

2. The terminal according to claim 1, wherein the transceiver and the processor are further configured to:

receives a first signaling indicative of a second time-frequency resource, associated with the second identity, and as a response to receiving the first signaling, stops a random access procedure, wherein the first time-frequency resource is associated with the first identity, and wherein the first message is an MsgA, and wherein performing the random access procedure comprises monitoring a second signaling in a first search space, and wherein the second signaling is used for scheduling a response to the first message, and wherein stopping the random access procedure comprises stopping monitoring the second signaling.

3. The terminal according to claim 2, wherein the random access procedure is used for a Scheduling Request (SR), and wherein stopping the random access procedure does not comprise cancelling an SR used to trigger the random access procedure.

4. The terminal according to claim 1, wherein the transceiver and the processor are further configured to:

performs a channel measurement on a first signal to determine a first measurement value, wherein the first time-frequency resource is associated with the first signal, and wherein whether the first measurement value is above a first threshold is used to determine whether the first message is MsgA or Msg1.

5. The terminal according to claim 1, wherein the random access procedure is performed on a first Bandwidth Part (BWP), a rach-ConfigDedicated used for configuring the first BWP provides contention-free 2-step RA type random access resources but does not provide contention-free 4-step RA type random access resources.

6. The terminal according to claim 1, wherein the transceiver and the processor are further configured to:

receives a second signaling used to schedule a response to the first message, wherein a Cyclic Redundancy Check (CRC) comprised in the second signaling is scrambled by a first Radio Network Temporary Identifier (RNTI), wherein the first RNTI is related to time-frequency resources occupied by the first message, and wherein whether a first integer is used to determine the first RNTI is related to whether the first message is a MsgA or an Msg1, and wherein the first integer is fixed or the first integer is configured via an RRC signaling.

7. The terminal according to claim 1, wherein the first time-frequency resource being associated with the first identity means: at least one of an RRC signaling configuring the first time-frequency resource comprising the first identity, or there being an explicit signaling indicating that the first time-frequency resource and the first identity are associated.

8. The terminal according to claim 1, wherein the first time-frequency resource being associated with the second identity means: at least one of an RRC signaling configuring the first time-frequency resource comprising the second identity, or there being an explicit signaling indicating that the first time-frequency resource and the second identity are associated.

9. The terminal according to claim 1, wherein the target information block is used for configuring a Transmission Configuration Indicator (TCI) of a Physical Downlink Control CHannel (PDCCH) and a Physical Downlink Shared CHannel (PDSCH), or the target information block is used for configuring a TCI of a Physical Uplink Control CHannel (PUCCH) and a Physical Uplink Shared CHannel (PUSCH), or the target information block is used for configuring a TCI of a PDSCH and a PUSCH, or the target information block is used for configuring a same TCI-StateID used by radio signals transmitted on multiple carriers.

10. The terminal according to claim 1, wherein the target information block is used for configuring a unified TCI.

11. The terminal according to claim 1, wherein the first identity is a PCI of a serving cell, while the second identity is a PCI, and the second identity is different from the first identity.

12. The terminal according to claim 1, wherein the second time-frequency resource is a non-zero-power CSI-RS resource, or the second time-frequency resource is a Synchronization Signal and PBCH block (SSB) resource indicated by an ssb-Index.

13. A base station comprising:

a transceiver; and a processor, and wherein the transceiver and the processor are configured to:

transmit a target information block, wherein the target information block is generated in a protocol layer below an RRC layer, and wherein the target information block is used to determine a first time-frequency resource, receive a first message, wherein the first time-frequency resource is associated with one of a first identity and a second identity, and wherein the first message is used for random access, and wherein whether the first time-frequency resource is associated with the first identity is used to determine whether the first message is a MsgA or an Msg1, and transmit at least one of a first information block and a second information block, wherein the first information block is used to determine a first candidate time-frequency resource set, while the second information block is used to determine a second candidate time-frequency resource set, and wherein on a condition that the first message is a MsgA, time-frequency resources occupied by the first message associated with the first candidate time-frequency resource set, and wherein on a condition that the first message is a Msg1, time-frequency resources occupied by the first message associated with the second candidate time-frequency resource set.

14. The base station according to claim 13, wherein the transceiver and the processor are further configured to:

transmits a first signaling, indicative of a second time-frequency resource associated with the second identity, and as a response to receiving the first signaling, stop the random access procedure, wherein the first time-frequency resource is associated with the first identity, and wherein the first message is a MsgA, and wherein performing the random access procedure comprises monitoring a second signaling in a first search space; the second signaling is used for scheduling a response to the first message, and wherein stopping the random access procedure comprises stopping monitoring the second signaling.

15. The base station according to claim 14, wherein the random access procedure is used for an SR, and wherein stopping the random access procedure does not comprise cancelling an SR used to trigger the random access procedure.

16. The base station according to claim 13, wherein the transceiver and the processor are further configured to:

transmits a first signal, wherein a channel measurement is performed on the first signal to determine a first measurement value, and wherein the first time-frequency resource is associated with the first signal, and wherein whether the first measurement value is above a first threshold is used to determine whether the first message is a MsgA or a Msg1.

17. The base station according to claim 13, wherein the random access procedure is performed on a first BWP, a rach-ConfigDedicated used for configuring the first BWP provides contention-free 2-step random access type (2-step RA type) random access resources but does not provide contention-free 4-step random access type (4-step RA type) random access resources.

18. A method in a terminal for wireless communications, comprising:

receiving a target information block that is generated in a protocol layer below a Radio Resource Control (RRC) layer;

determining, based on the target information block, a first time-frequency resource associated with one of a first identity and a second identity;

determining whether a first message is a Message A (MsgA) or a Message 1 (Msg1) based on whether the first time-frequency resource is associated with the first identity:

receiving at least one of a first information block and a second information block;

determining a first candidate time-frequency resource set based on the first information block;

determining a second candidate time-frequency resource set based on the second information block;

transmitting a first message used for random access, wherein on a condition that the first message is a MsgA, time-frequency resources occupied by the first message associated with the first candidate time-frequency resource set, and wherein on a condition that the first message is a Msg1, time-frequency resources occupied by the first message associated with the second candidate time-frequency resource set.

* * * * *